US012131353B2

(12) United States Patent
McLaughlin

(10) Patent No.: US 12,131,353 B2
(45) Date of Patent: Oct. 29, 2024

(54) DYNAMIC ADVERTISEMENT FOR EMAIL NEWSLETTER

(71) Applicant: Paved, Inc., New York, NY (US)

(72) Inventor: John McLaughlin, New York, NY (US)

(73) Assignee: PAVED, INC., New York, NY (US)

( * ) Notice: Subject to any disclaimer, the term of this patent is extended or adjusted under 35 U.S.C. 154(b) by 0 days.

(21) Appl. No.: 18/383,218

(22) Filed: Oct. 24, 2023

(65) Prior Publication Data

US 2024/0135412 A1 Apr. 25, 2024
US 2024/0232952 A9 Jul. 11, 2024

Related U.S. Application Data

(60) Provisional application No. 63/418,693, filed on Oct. 24, 2022.

(51) Int. Cl.
*G06Q 30/02* (2023.01)
*G06Q 30/0241* (2023.01)
*H04L 51/08* (2022.01)

(52) U.S. Cl.
CPC ......... *G06Q 30/0276* (2013.01); *H04L 51/08* (2013.01)

(58) Field of Classification Search
CPC .............. G06Q 30/02–0277; H04L 51/08
See application file for complete search history.

(56) References Cited

U.S. PATENT DOCUMENTS

2021/0012376 A1 1/2021 Donovan et al.

FOREIGN PATENT DOCUMENTS

KR 20010036286 A * 5/2001
WO WO-2005027006 A1 * 3/2005 ......... G07C 9/00134

OTHER PUBLICATIONS

"Marketing Spot Optimization"ip.com Disclosure No. IPCOM000229301D PublicationDate:Jun. 19, 2013 (Year: 2013).*

* cited by examiner

Primary Examiner — Raquel Alvarez
(74) Attorney, Agent, or Firm — Panitch Schwarze Belisario & Nadel LLP

(57) ABSTRACT

A method for creating an advertisement for dynamic insertion into an email newsletter includes loading, by a server, an advertising template, receiving, by the server over a network from an advertiser computing device, advertising data including at least one of text data or image data, inserting, by the server, at least a portion of the received advertising data into the loaded advertising template, rendering, by the server from the loaded advertising template containing the at least a portion of the received advertising data, a display version of the advertisement, acquiring, by the server, an image file depicting the display version of the advertisement, storing, by the server, the image file, and retrieving, by the server for provision over a network to a recipient computing device, the image file in response to a call from the recipient computing device for the image file for display in the email newsletter.

13 Claims, 7 Drawing Sheets

200

**Need Help Keeping Your IG — 204
Influencer Campaigns Organized?**

Download this free IG Campaign Manager — 206
Spreadsheet to organize your influencers and
streamline the process.

Download — 208

Sponsored

Need Help Keeping Your IG Influencer Campaigns Organized?

Download this free IG Campaign Manager Spreadsheet to organize your
influencers and streamline the process.

304

306    308    Download

Sponsored

**Need Help Keeping Your IG
Influencer Campaigns — 404
Organized?**

Download this free IG Campaign
Manager Spreadsheet to organize your
influencers and streamline the process.

406

Download — 408

Sponsored

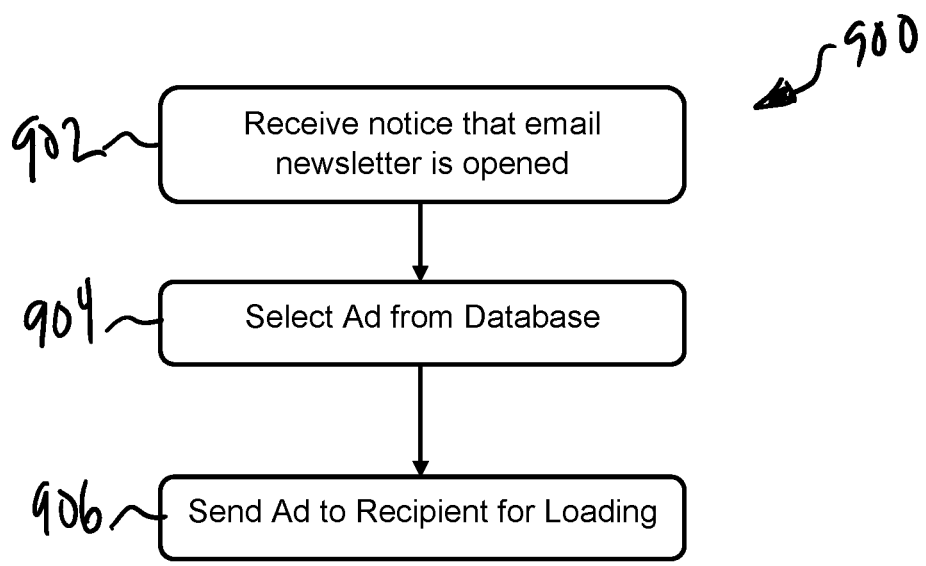

DYNAMIC ADVERTISEMENT FOR EMAIL NEWSLETTER

CROSS-REFERENCE TO RELATED APPLICATIONS

This application claims priority to U.S. Provisional Patent Application No. 63/418,693, filed on Oct. 24, 2022, entitled "Dynamic Advertisement for Email Newsletter," the entire contents of which are incorporated by reference herein.

BACKGROUND

Embodiments described herein relate generally to advertisements in email newsletters, and more particularly, to creating and dynamically inserting advertisements into an email newsletter.

Email newsletters are a common method of communicating useful information to subscribers, customers, clients, and the like. Such newsletters can also contain advertisements, either by the newsletter creator or by third parties that pay the creator to include their marketing material. However, unlike webpages or apps, which can utilize dynamic advertisements (e.g., a dynamic banner advertisement or the like which can change depending on particular conditions), email does not allow for dynamic content. Emails may incorporate images, text, and some limited HTML and styling. These limitations ordinarily require that an advertisement be placed in the email in advance, and it cannot be changed once it is finalized and opened by the recipient. Such limitations can also hinder the ability to match the advertisement design to that of the rest of the newsletter.

It is desirable to provide a method for enabling the creation and dynamic insertion of content into an advertisement within an email newsletter.

BRIEF SUMMARY

Briefly stated, one embodiment comprises a method for creating an advertisement for dynamic insertion into an email newsletter. The method includes loading, by a server, an advertising template, receiving, by the server over a network from an advertiser computing device, advertising data including at least one of text data or image data, inserting, by the server, at least a portion of the received advertising data into the loaded advertising template, rendering, by the server from the loaded advertising template containing the at least a portion of the received advertising data, a display version of the advertisement, acquiring, by the server, an image file depicting the display version of the advertisement, storing, by the server, the image file, and retrieving, by the server for provision over a network to a recipient computing device, the image file in response to a call from the recipient computing device for the image file for display in the email newsletter.

In one aspect, the rendering of the display version of the advertisement includes loading code representing the display version of the advertisement into a headless browser. In a further aspect, the code representing the display version of the advertisement is in HTML format.

In another aspect, the acquiring of the image file includes capturing a screenshot of the display version of the advertisement. In a further aspect, the image file is in one of JPEG or PNG format.

In yet another aspect, the method further includes providing a graphical user interface over the network to the advertiser computing device. The graphical user interface includes one or more input fields. In a further aspect, the one or more input fields include at least one of a text box or an image upload box.

In still another aspect, the received advertising data further includes a landing page URL for affiliation with the image file.

In another aspect, the server loads the template before receiving the advertising data.

In yet another aspect, the method further includes acquiring, by the server, a second image file depicting an alternate display version of the advertisement.

In still another aspect, the server stores the image file with data representing identification of one or more newsletters with which the advertisement is affiliated.

In another aspect, the call from the recipient computing device is based on an image tag placed in the email newsletter. The image tag has a URL pointing to the server.

In yet another aspect, the method further includes receiving, by the server, changes to the advertising template. The changes include at least one or more of modifications to advertisement layout, color scheme, text content, or images.

BRIEF DESCRIPTION OF THE SEVERAL VIEWS OF THE DRAWINGS

The following detailed description of preferred embodiments will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings:

FIG. 2 is a screenshot of a second example advertisement;

FIG. 3 is a screenshot of a third example advertisement;

FIG. 4 is a screenshot of a fourth example advertisement;

FIG. 9 is a flow diagram illustrating an example method for sending an advertisement as part of an email newsletter in accordance with an embodiment of the present invention.

DETAILED DESCRIPTION

Figure 1:
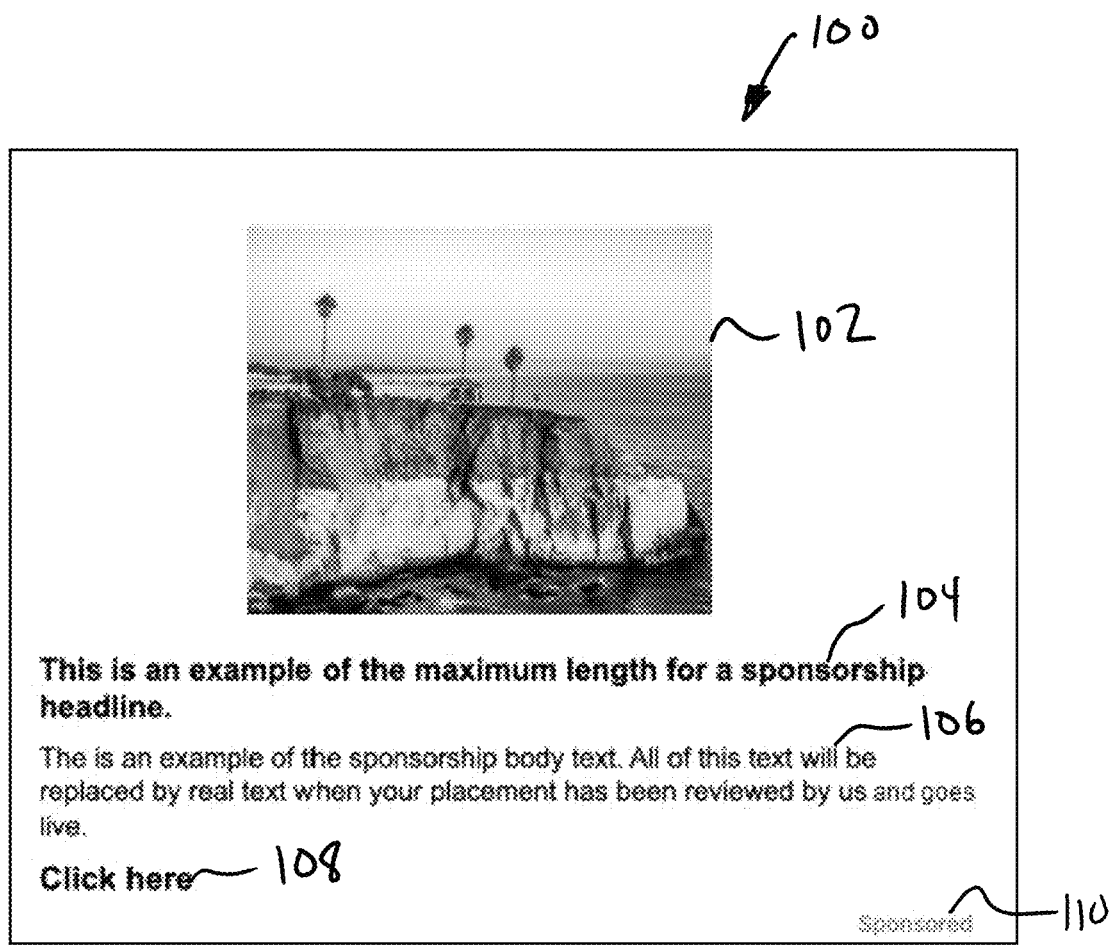
FIG. 1 is a screenshot of a first example advertisement for use in embodiments of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

It should also be understood that the terms "about," "approximately," "generally," "substantially" and like terms, used herein when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIG. 1, there is shown a first example of an advertisement 100 for use with embodiments of the present invention. The advertisement 100 may have at least one of the following four features: an image 102, a headline 104, a text body 106, and/or a call to action (CTA) 108. In the advertisement 100 of FIG. 1, the four features 102, 104, 106, 108 are arranged vertically in order. However, the features 102, 104, 106, 108 may be arranged in any desired orientation and order. For example, FIGS. 2-4 show additional examples of advertisements 200, 300, 400. In FIG. 2, the advertisement 200 lacks an image, but includes a headline 204, text body 206, and CTA 208 arranged vertically. In FIG. 3, the advertisement 300 similarly lacks an image and arranges the headline 304, text body 306, and CTA 308 vertically, but the overall advertisement 300 is wider and the CTA 308 is shown in a separately designated box rather than as an underlined link. In FIG. 4, the advertisement 400 include an image 402 that is arranged to the left of the headline 404, text body 406, and CTA 408. Any arrangement of the features may be utilized, subject to size and configuration constraints of placement of the advertisement within an email newsletter. In addition, while some of the features may be omitted entirely, it is also possible to have more than one of any or each feature, as desired. The advertisement may also include other features beyond those recited above, as desired. For example, FIG. 1 shows a sponsorship label 110 in the lower right-hand corner of the advertisement.

Figure 5:
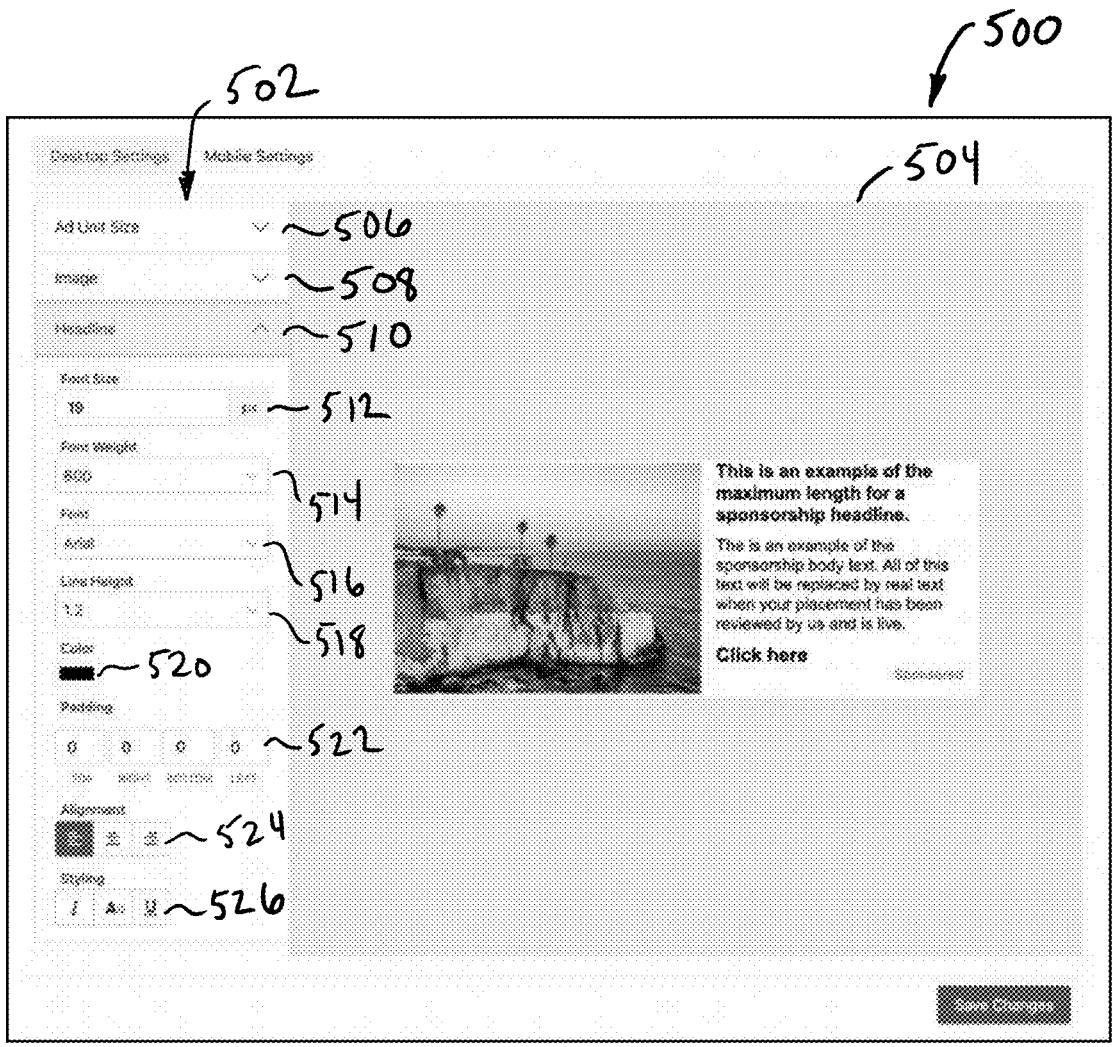
FIG. 5 is a screenshot of an example advertisement template editor in accordance with an embodiment of the present invention.

The features and/or arrangement thereof for an advertisement may be provided as part of a template, which may be editable, for example, by the newsletter creator, third party advertisers, or the like. FIG. 5 shows a screenshot of an example advertisement template editor interface 500. In the interface 500 of FIG. 5, an options panel 502 and a preview window 504 may be provided. A user may utilize the options panel 502 to select characteristics for the various features, arrangement, orientation, and the like of the advertisement. The preview window 504 may show how an advertisement would appear given the presently selected options. However, this arrangement of an advertisement editor interface is not limiting. For example, while editing options, the user may be unable to see a preview of the advertisement until a preview link is selected. In other examples, the user may be able to graphically move and arrange portions of the advertisement directly on the preview. Any number of options and arrangements for allowing an advertisement editor interface can be utilized in keeping with the invention.

Upon application of any changes to the template, the template may be reviewed by an automatic or manual process to ensure any modifications are compliant with predefined criteria and/or requirements. Once approved, all advertisements linked to the updated template may be regenerated to reflect the current version of the template. This regeneration process may involve replicating the original creation method of loading the advertisement data into the modified template to create a new display version of the advertisement, acquiring a new image file, and replacing the old image file in storage, as described in further detail below.

The options panel 502 may include a menu for ad unit size 506, which may be used to select the size of the advertisement template. The ad unit size may be selectable in standard units (e.g., inches, cm, or the like) or pixels. In some embodiments, each dimension (e.g., height and/or width) of the advertisement may be selected at any size between minimum and maximum allowable values. In some other embodiments, the ad unit size menu 506 may only list a plurality of standard, predetermined sizes for the advertisement. In still further embodiments, the user may select a predetermined size or customize the size of the advertisement. In some embodiments, the user may be able to select a background color for the advertisement.

The options panel 502 may also include an image menu 508. The image menu 508 may allow the user to enable or disable use of an image in the advertisement. If an image is enabled, the user may also be able to select an image size, an arrangement of the image relative to text in the advertisement, and/or file type. In some embodiments, the image menu 508 may allow the user to alter image characteristics (e.g., cropping, brightness, contrast, or the like). The user may also be able to position the image within the advertisement (e.g., left, right, top, or the like) and align content with respect to the image (e.g., top, middle, bottom, or the like). The user may also be able to select a required, maximum, and/or minimum height and/or width of the image. In still further embodiments, the image menu 508 may allow the user to upload an image file for the advertisement template and/or select a stock image to be used.

The options panel 502 may also include a headline menu 510. The headline menu 510 may allow the user to enable or disable the use of a headline in the advertisement, as well as allow for adjusting characteristics of the headline. For example, the headline menu 510 may allow for selection of font size 512, font weight 514, font type 516, line height 518, font color 520, padding 522, alignment 524, styling 526, and/or other like characteristics. While not shown in FIG. 5, the options panel 502 may also include a body text menu having similar font, appearance, and alignment options. Similar options can be presented in a CTA menu (not shown), which may also include an option for choosing a predetermined CTA (e.g., "click here", "download", "buy", "subscribe", "order", "donate", "learn more", and the like). Additional menus can be provided for any other configurable aspects of the advertisement, such as the sponsorship label 110 (e.g., allowing enablement, positioning, font type, size, and weight, color, padding, alignment, styling, or the like) or the like.

The various menus (e.g., 506, 508, 510, and the like) in the options panel 502 may be presented as actuable drop-down menus, although other formats for presenting selectable options for formatting the advertisement can be used as well in keeping with the invention. In some embodiments, clicking on aspects of the advertisement in the preview window 504 may also trigger opening and/or closing of the menus 506, 508, 510 for selection. In addition, in some embodiments, formatting can be selected depending on how the advertisement is viewed, for example on a desktop as opposed to a mobile device. For example, ad unit size and formatting may change as a result of the smaller screen sizes on mobile devices.

In addition to the options panel 502 or alternatively, the user may be able to apply custom styling to one or more aspects of the template using Cascading Style Sheets (CSS) or the like. The user may also be enabled to upload an HTML or like coded template in lieu of designing the template directly using the interface 500.

Figure 6:
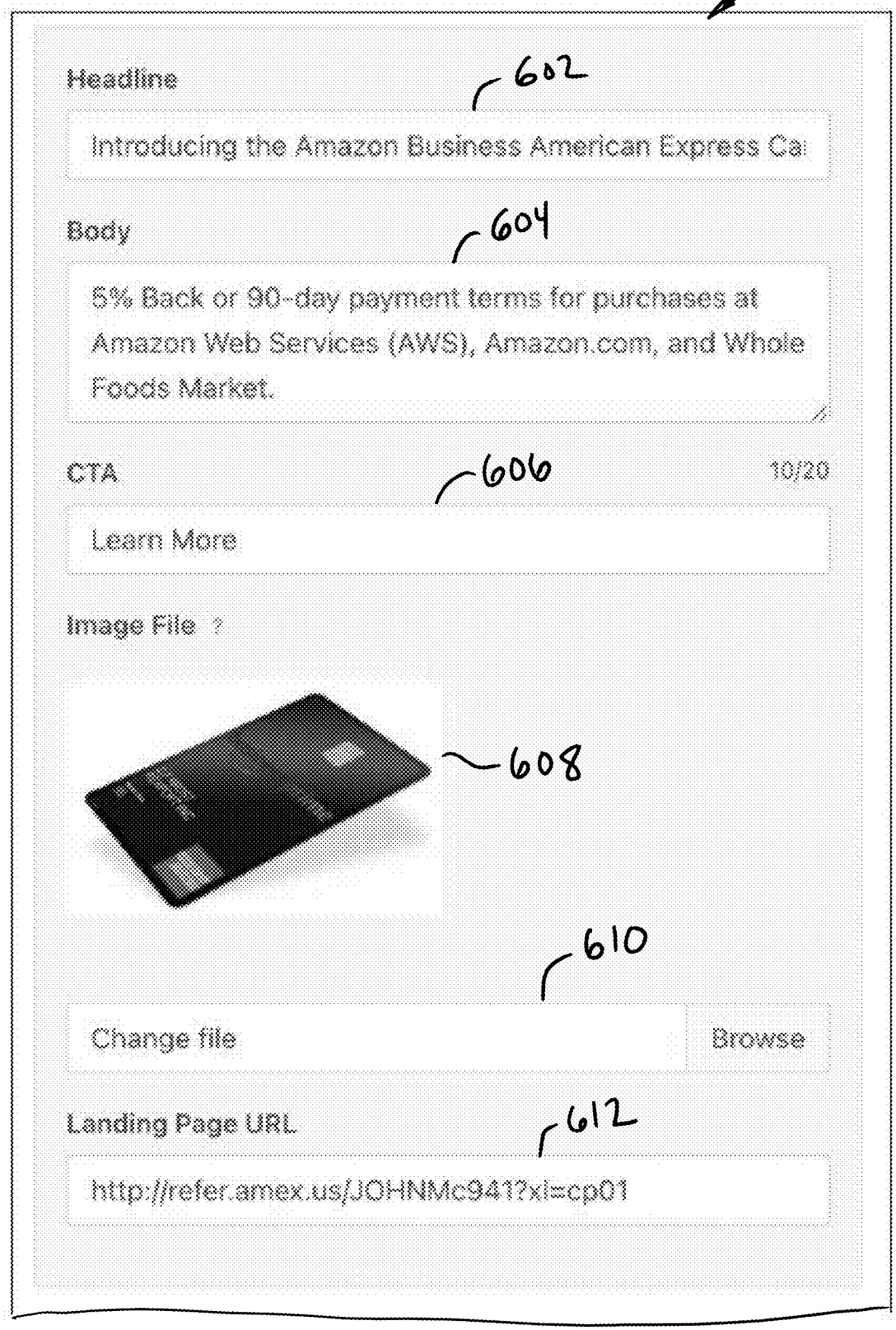
FIG. 6 is a screenshot of an example advertisement input interface in accordance with an embodiment of the present invention.

When an advertiser wishes to create an advertisement, they may select (or be provided with) an appropriate template and information for the advertisement may be received. FIG. 6 shows a screenshot of an example advertisement input interface 600 which may be provided to solicit the appropriate information for completing the advertisement within the template. In the example shown in FIG. 6, the input interface 600 includes text boxes for creating the headline 602, body 604, and CTA 606. Any or all of the text boxes 602, 604, 606 may include character or word limits to ensure that any entered text will fit within the template selected for the advertisement. The example input interface 600 in FIG. 6 also includes an image preview window 608 and an image upload box 610. A user may use the image upload box 610 to select a local or network-stored image for upload for use in the advertisement, although other methods of selecting an image file may be used as well. The example input interface 600 may also include a box for entering a landing page URL 612, to which the end user will be taken by clicking on the advertisement.

Other information may be received by the interface 600 or another input interface, as required by the advertisement template or for other purposes (e.g., information regarding the advertiser, payment information, and/or the like). In some embodiments, various inputs of the interface may only be visible to the user when the template enables the associated feature. For example, if the selected template does not include an image, then the image upload box 610 and preview window 608 may be greyed out or entirely omitted from the interface 600.

Figure 7:
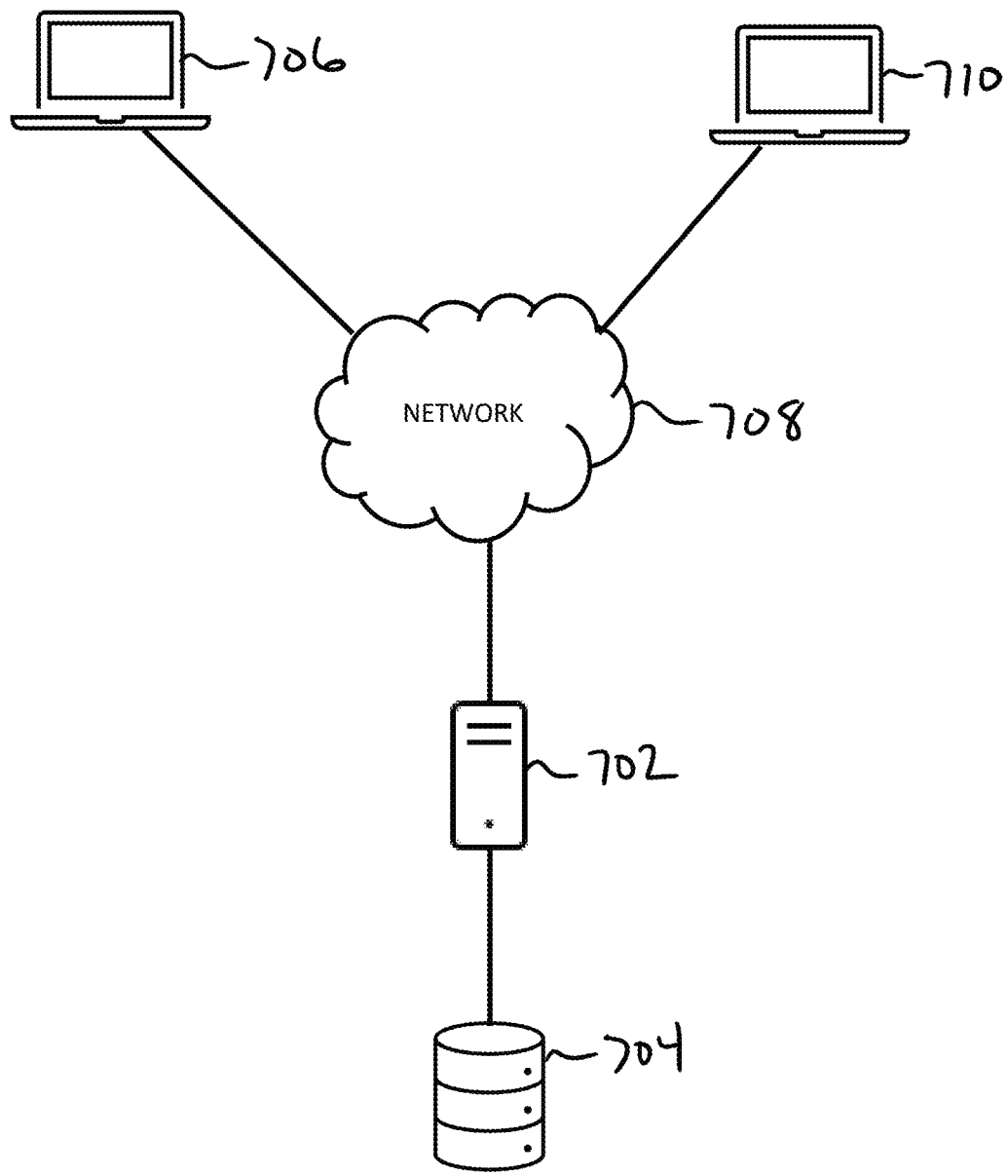
FIG. 7 is a schematic block diagram of an example system architecture for use with embodiments of the present invention.

FIG. 7 is a schematic block diagram of an example system architecture 700 for implementing the advertisement creation and/or insertion described herein. The newsletter creator and/or distributor may operate one or more servers 702, which may include or be in communication with one or more databases 704. An advertiser desiring to submit an advertisement for insertion into an email newsletter may have a computing device 706 (e.g., a desktop, tablet, mobile device, laptop, or the like) configured to communicate over a network 708 (which may be a LAN, WAN, the Internet, cellular network, or other type of wired and/or wireless communication network) with the server(s) 702. Similarly, the end recipient of the email newsletter may have a computing device 710 configured to communicate over the network 708 with the server(s) 702 to receive the email newsletter. While the advertiser and recipient devices 706, 710 are shown communicating with the server(s) 702 using the same network 708, it may be possible that the communication occurs over different networks. Moreover, any number of additional devices (not shown) may be provided between the server(s) 702 and the computing devices 706, 710, including intermediate servers (e.g., mail servers, network servers, or the like), routers, and the like. In addition, the newsletter creator/distributor may have one or more computing devices (not shown) configured to communicate with the server(s) 702 either directly (e.g., peer-to-peer) or through a network (e.g., network 708 or another public or private network). Similarly, the server(s) 702 may communicate with external databases 704 directly or via a network (e.g., network 708 or another public or private network), as necessary.

Interfaces for designing and creating advertisements, such as the advertisement template editor interface 500 and the advertisement input interface 600 described above, may be implemented via websites that may be hosted by the server(s) 702 or hosted on, for example, an Internet server (not shown) which can provide the information received via the interfaces back to the server(s) 702. In other embodiments, the interfaces may be provided as dedicated applications that can be downloaded to and run on, for example, the advertiser computing device 706 and/or other devices, wherein the application is configured to communicate received information back to the server(s) 702. The application may be stored at the server(s) 702 or database(s) 704 for retrieval, or may be provided from other sources (e.g., a third party provider server or the like).

Figure 8:
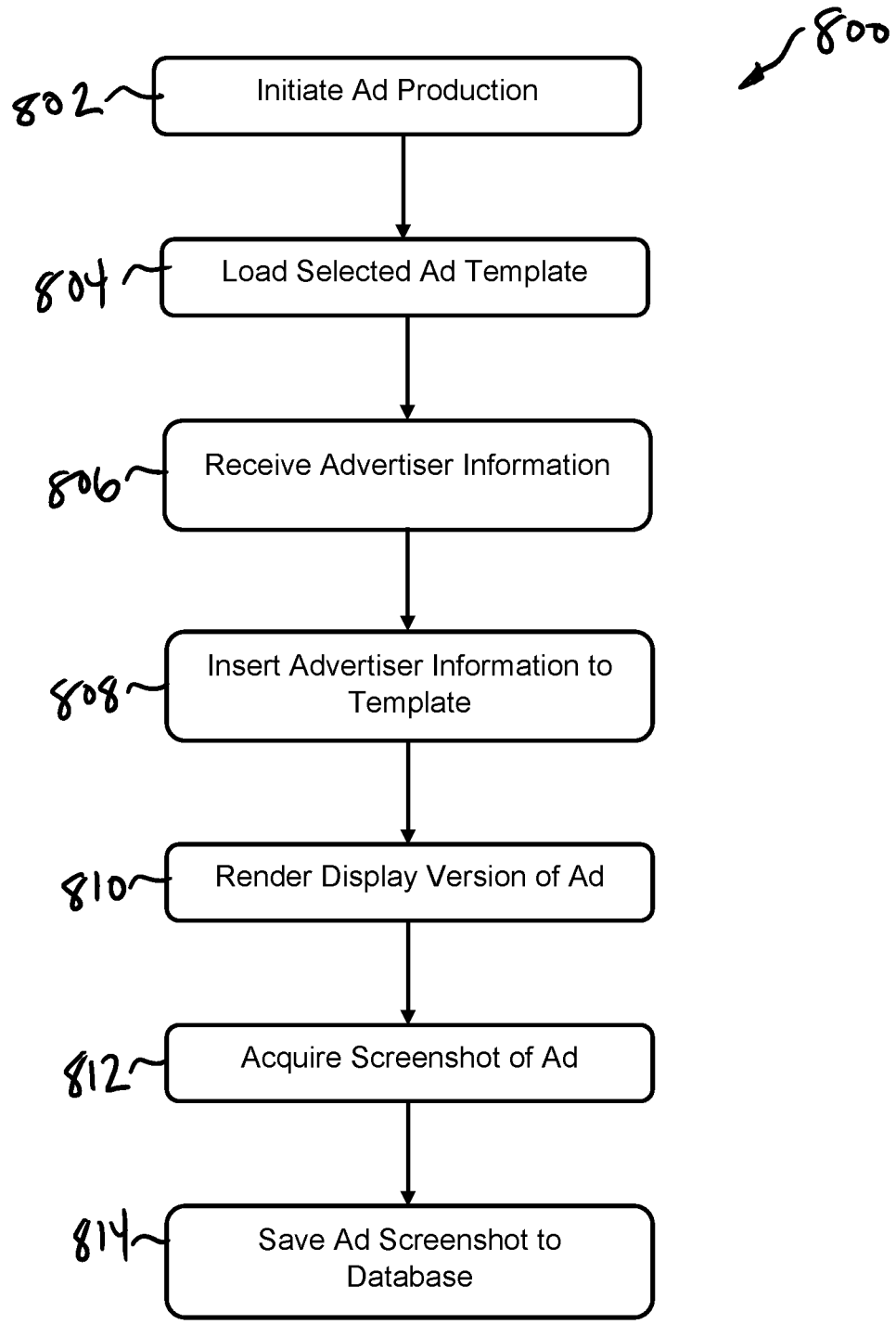
FIG. 8 is a flow diagram illustrating an example method for producing an advertisement in accordance with an embodiment of the present invention.

FIG. 8 depicts one example method 800 for producing an advertisement. The method may begin at step 802 by receiving a request from a user to initiate advertisement production. This may be performed by opening or interacting with a website, app, or the like. If the user has not previously created a template or wishes to create a new template, the user may do so at this time. Alternatively, template creation may be performed outside of the method shown in FIG. 8, as a separate and independent process using, for example, an interface such as the interface 500 shown in FIG. 5 presented to the user on computing device 706 or the like. The user may also, in some embodiments, be given the option to edit a previously saved template, as desired. Templates may be saved in one or more database(s) 704, at the server 702, or in other external storage locations. The templates may be saved in HTML format, although other like formats may be used as well.

At step 804, in response, for example, to a request or selection from the user for a particular template, the server 702 may load from storage an advertisement template for use in creating the advertisement. In some embodiments, the template may be loaded automatically as, for example, a default option or the like. In some other embodiments, where the user is actively editing or creating a template, the template may be loaded automatically or may already be loaded in response to such action.

At step 806, the server 702 may receive advertiser information. For example, the user may submit text and/or images for use in the advertisement, along with potentially other relevant data, through an interface such as the interface 600 shown in FIG. 6. It should be noted that although steps 804 and 806 are shown being performed sequentially in FIG. 8, the steps may be performed simultaneously or in reverse order (e.g., advertiser information may be received prior to loading of the template). The precise order of these steps is not critical to the invention. At step 808, the server 702 may take relevant data from the received advertiser information and insert it into the loaded template.

In step 810, a display version of the advertisement is rendered. In some embodiments, this step may be performed by loading the HTML or like code of the complete advertisement with content and template into a headless browser (e.g., Headless Chrome or the like). In other embodiments, the advertisement code may be loaded into a conventional browser with GUI, or can be rendered using other like methods. At step 812, a screenshot or like image of the rendered advertisement is acquired. The screenshot is then saved at step 814 to the database(s) 704, the server 702, or other external storage. The screenshot may be saved in the form of a JPEG and/or PNG file, although other types of image files may be used as well. In some embodiments, multiple screenshots may be captured to account for various presentation formats. For example, one screenshot may be saved at twice the size of the original for use on high-resolution display screens (e.g., RETINA displays available on APPLE devices and the like). The image may be scaled up or down from the original depending on the particular display requirements. The screenshot may be saved along with data representing identification of a newsletter or newsletters with which the advertisement may be affiliated. In other embodiments, assignment of an advertisement to a particular newsletter may be made subsequent to the saving operation.

FIG. 9 depicts one example method 900 for sending an advertisement as part of an email newsletter. When a newsletter is created, one or more saved advertisements may be affiliated with the newsletter. The newsletter may be emailed to recipients for reading. When a recipient opens the newsletter in their email, or requests download of images in the email, the server 702 may receive from the recipient computing device 710 or the like a notice at step 902 that the email newsletter has been opened. For example, an image tag may be placed in the newsletter having a URL pointing to the server 702 or the like. Upon opening the newsletter, a call to the server 702 is placed based on the image tag. In response, the server 702 may retrieve the appropriate advertisement from the database 704 (or other storage) at step 904. The server 702 then sends the advertisement to the recipient for loading as part of the newsletter for viewing on the recipient's computing device 710.

It is contemplated that while the server 702 shown in FIG. 7 may be utilized to execute both advertisement creation and distribution operations, it is also possible that discrete servers may be used to separately perform the operations. Indeed, the server 702 may include a plurality of individual processors or other types of controllers or server architectures, with functions divided among the individual devices as desired.

Those skilled in the art will recognize that boundaries between the above-described operations are merely illustrative. The multiple operations may be combined into a single operation, a single operation may be distributed in additional operations and operations may be executed at least partially overlapping in time. Further, alternative embodiments may include multiple instances of a particular operation, and the order of operations may be altered in various other embodiments.

While specific and distinct embodiments have been shown in the drawings, various individual elements or combinations of elements from the different embodiments may be combined with one another while in keeping with the spirit and scope of the invention. Thus, an individual feature described herein only with respect to one embodiment should not be construed as being incompatible with other embodiments described herein or otherwise encompassed by the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined herein.

I claim:

1. A method for creating an advertisement for dynamic insertion into an email newsletter, the method comprising:
   loading, by a server, an advertising template;
   receiving, by the server over a network from an advertiser computing device, advertising data including at least one of text data or image data;
   inserting, by the server, at least a portion of the received advertising data into the loaded advertising template;
   rendering, by the server from the loaded advertising template containing the at least a portion of the received advertising data, a display version of the advertisement;
   acquiring, by the server, an image file depicting the display version of the advertisement;
   storing, by the server, the image file; and
   retrieving, by the server for provision over a network to a recipient computing device, the image file in response to a call from the recipient computing device for the image file for display in the email newsletter.

2. The method of claim 1, wherein the rendering of the display version of the advertisement includes loading code representing the display version of the advertisement into a headless browser.

3. The method of claim 2, wherein the code representing the display version of the advertisement is in HTML format.

4. The method of claim 1, wherein the acquiring of the image file includes capturing a screenshot of the display version of the advertisement.

5. The method of claim 4, wherein the image file is in one of JPEG or PNG format.

6. The method of claim 1, further comprising providing a graphical user interface over the network to the advertiser computing device, the graphical user interface including one or more input fields.

7. The method of claim 6, wherein the one or more input fields include at least one of a text box or an image upload box.

8. The method of claim 1, wherein the received advertising data further includes a landing page URL for affiliation with the image file.

9. The method of claim 1, wherein the server loads the template before receiving the advertising data.

10. The method of claim 1, further comprising acquiring, by the server, a second image file depicting an alternate display version of the advertisement.

11. The method of claim 1, wherein the server stores the image file with data representing identification of one or more newsletters with which the advertisement is affiliated.

12. The method of claim 1, wherein the call from the recipient computing device is based on an image tag placed in the email newsletter, the image tag having a URL pointing to the server.

13. The method of claim 1, further comprising receiving, by the server, changes to the advertising template, the changes including at least one or more of modifications to advertisement layout, color scheme, text content, or images.

* * * * *